June 8, 1948.　　　　　T. A. BOWERS　　　　　2,443,065
PISTON RING ASSEMBLY
Filed Nov. 14, 1940　　　　　　　　　　　　2 Sheets-Sheet 1
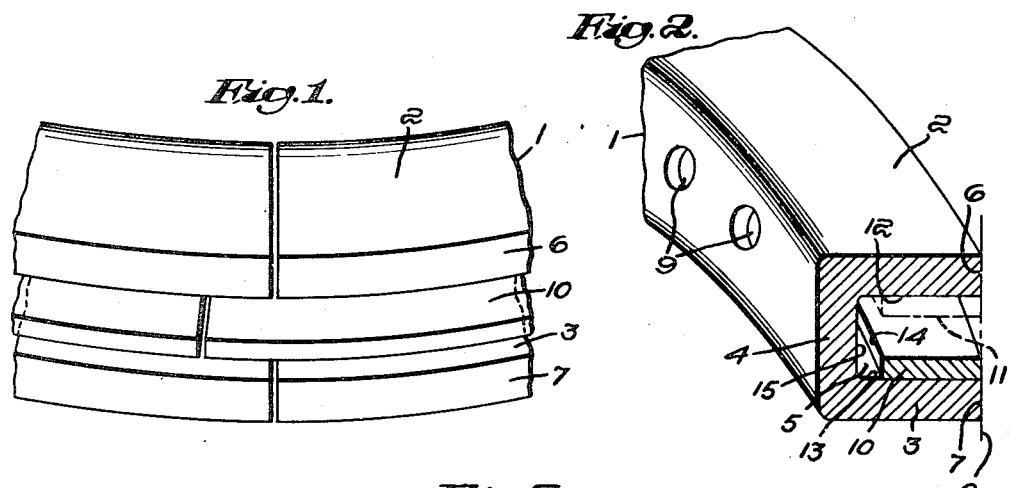
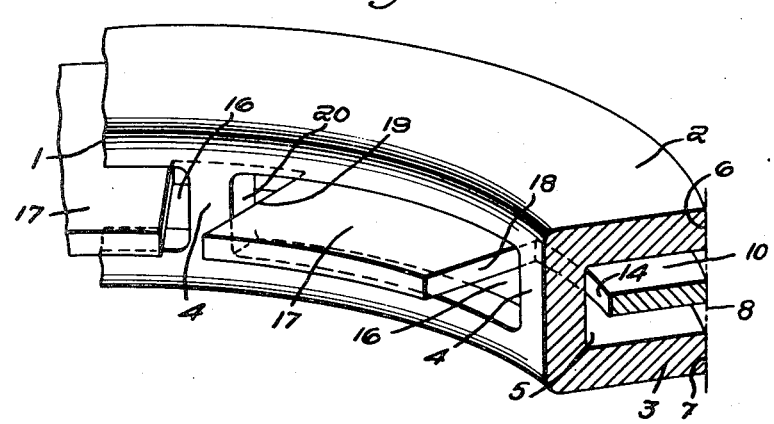
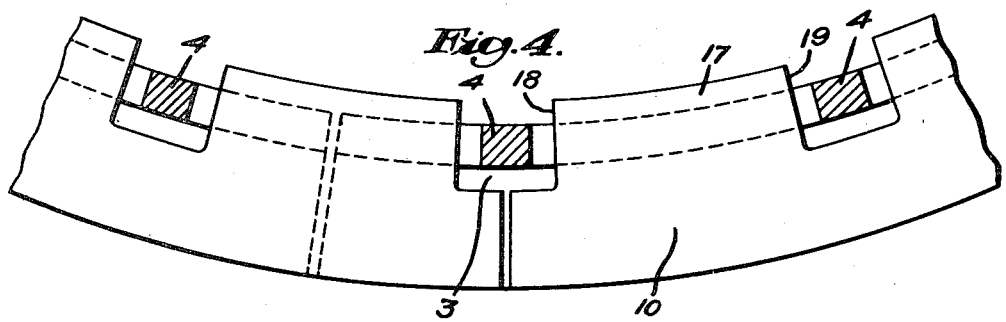
Inventor:
Thomas A. Bowers
by Munn N. Hamilton
Attorney June 8, 1948. T. A. BOWERS 2,443,065
PISTON RING ASSEMBLY
Filed Nov. 14, 1940 2 Sheets-Sheet 2
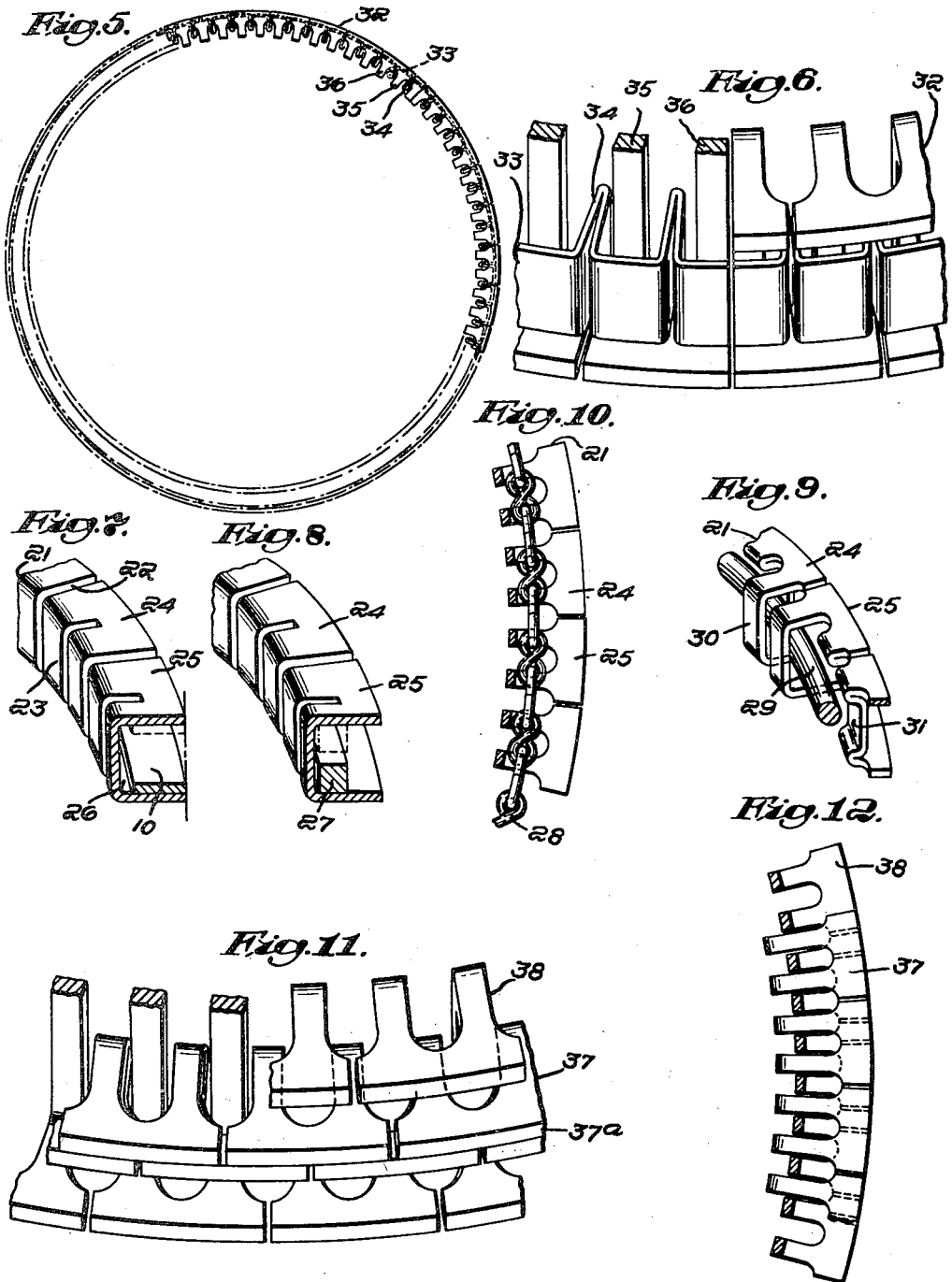

Patented June 8, 1948

2,443,065

UNITED STATES PATENT OFFICE 2,443,065

PISTON RING ASSEMBLY

Thomas A. Bowers, Mattapoisett, Mass., assignor, by mesne assignments, to Thompson Products, Inc., Cleveland, Ohio, a corporation of Ohio Application November 14, 1940, Serial No. 365,600

19 Claims. (Cl. 309—45)

This invention relates to piston rings and more especially to oil control piston rings of the type having a plurality of oil metering edges for removing oil from a cylinder wall.

In oil ring constructions of this character, it is customary to provide channels into which oil collected by the oil metering edges may pass. It is further the practice to provide openings which extend radially through the ring structures and lead to additional openings in the back of piston ring grooves by which oil is passed back to the crankcase. During the operation of oil rings, particularly with internal combustion motors, carbon tends to form and fill up the oil passages. The carbon may occur in a hard scaly form and it may collect as a thick viscous mass. When either the channel between the oil metering edges or the radially extending openings of the ring become partially or entirely filled with this carbon, the ring fails to satisfactorily remove oil from the cylinder wall. If excess amounts of oil are left on the cylinder wall, they become burned. This increases oil consumption and greatly reduces the life and efficiency of the motor.

A principal object of the invention is to improve oil control piston rings and to prevent deposit of carbon on such rings, with a view to maintaining oil passages of the ring open and thereby effecting savings in oil consumption and increasing the life and efficiency of combustion motors. It is a further object of the invention to provide a ring element which combines novel carbon deposit prevention with improved oil metering and which introduces novel flexibility characteristics.

The nature of the invention, and its objects, will be more fully understood from the following description of the drawings and discussion relating thereto.

In the accompanying drawings:

Fig. 1 is a fragmentary perspective view of the piston ring construction of the invention;

Fig. 2 is another fragmentary perspective view partly in cross section, further illustrating the piston ring construction referred to;

Fig. 3 is a fragmentary perspective view of another piston ring construction;

Fig. 4 is a fragmentary plan cross section of a piston ring construction similar to that shown in Fig. 3;

Fig. 5 is a plan view of another piston ring construction of the invention;

Fig. 6 is a fragmentary perspective view, partly in cross section, further illustrating the piston ring construction indicated in Fig. 5;

Figs. 7, 8 and 9 are perspective views illustrating modifications of the invention;

Fig. 10 is a fragmentary plan view of another modification of oil ring construction;

Fig. 11 is a fragmentary perspective view, partly in cross section, of still another modification of ring assembly; and Fig. 12 is a fragmentary plan view of a ring construction similar to that shown in Fig. 11.

Referring in detail to the drawings, numeral 1 denotes a piston ring which is intended to be generally illustrative of oil control piston rings utilized for metering oil on the wall of a cylinder, as for example cast iron C-type rings and others. The ring 1 is of conventional construction, being formed with spaced-apart sides or layers 2 and 3 respectively, which are joined together by a connecting portion 4 as shown in Fig. 2. The space between the sides 2 and 3 provides a channel or groove 5 extending circumferentially around the outer periphery of the ring 1. The edges 6 and 7 of the sides 2 and 3 respectively are adapted to engage with the wall of a cylinder diagrammatically indicated by the line 8 in Fig. 2. The ring 1 is provided with radially extending oil passages as 9 for passing oil collected by the edges 6 and 7 in the channel 5 to corresponding oil passages in a piston groove in which the ring is mounted.

In accordance with the present invention, the formation of carbon deposits in the oil passages described is prevented. This is effected by a ring element 10 associated with the ring 1 in some suitable manner. The ring element 10 may consist of a relatively thin ring body loosely disposed in the channel 5 in spaced relation to one of the sides of the channel, as shown in Figures 1 and 2, and it may vary considerably in construction.

Preferably the ring element is of a type such that it may engage against a cylinder wall in the same manner as the ring member 1. The spaced arrangement of the ring element 10 in the channel 5 allows the ring element to move axially of the ring 1 as for example into the position indicated by the broken line showing 11 in Fig. 2. During the reciprocation of a piston in a cylinder, the ring element 10 moves back and forth in the axial direction described, and in so doing there is provided a series of blows against inner surfaces 12 and 13 of the sides 2 and 3. These blows are highly effective in preventing the formation of carbon, particularly hard scaly carbon, on the surfaces 12 and 13, and in breaking away any carbon which may form. The inner peripheral edge 14 of the ring element 10 also greatly reduces carbon formation on the surface 15 of the connecting portion 4 by sliding up and down on this side during the various positions which the ring element may take in relation to the piston ring groove during reciprocation. In addition, the ring element may move both radially and circumferentially with relation to the channel 5, and this tends to furnish a further wearing action on carbon forming on any of the channel sides. There is a tendency for carbon to start to form first at the angles or points where two sides intersect and by forming the ring element 10 with sharp edges along its inner periphery 14, these points of intersection are particularly contacted and maintained clear of carbon.

An important feature of the invention is the combination with an oil ring of a loosely supported ring element which is adapted to resiliently engage a cylinder wall. Engagement of the ring element 10 with the cylinder provides an additional oil metering edge without increasing the possibility of carbon formation. This is a distinct advantage. It is further important to have the ring element 10 engage with the cylinder wall due to the fact that such contact insures more positive axial movement of the ring element with respect to the sides 2 and 3 of the ring 1. It will be seen that during the compression stroke of a piston, the ring element 10 will be engaged by one of the sides as 3. Should soft carbon of a thick viscous character succeed in forming in the oil channel 5, there would be a tendency for the ring element 10 to become stuck or adhered to the side 3 during the power stroke of the piston. However, the positive engagement of the ring element 10 on a cylinder wall tends to cause the side 3 to move away from the ring element at the beginning of the power stroke and the side 2 comes into engagement. This continuous reciprocation of the ring element, relative to the ring 1, tends to break down or wear away carbon formation of hard or soft character.

It will be seen that by the action of the ring element 10 improved oil metering is obtained, and the channel 5 is prevented from becoming clogged with carbon or decreased in size thereby. This insures an adequate reservoir for oil collected by the edges 6 and 7 at all times. Also, the ring element, by keeping clear the surface 15 or back wall of the connecting portion 4, insures maintenance of passageways for oil to move out of the channel 5 through the openings 9 into other openings in a piston.

In many types of oil rings, and in particular cast iron or cast iron and steel rings, it is the custom to provide relatively large oil passages extending radially through the oil ring construction. This is designed to allow faster circulation of oil away from the oil metering edges, and has been found to improve circulation of oil in a motor. As illustrative of such rings, Fig. 3 illustrates the ring 1 formed with enlarged oil passages 16 extending radially therethrough.

In accordance with a further aspect of the invention, the ring element 10 may be especially formed to prevent formation of carbon in the openings 16 of the ring referred to. This is effected by providing a plurality of projecting ends 17 which extend radially inward from the inner periphery of ring element 10 into the enlarged oil passages 16. Preferably the projecting ends 17 will be somewhat smaller than the openings 16 thereby to provide free movement of the ring element 10 at all times. It will be seen that the projecting ends 17 moving in the opening 16 prevent formation of carbon, and this desirable result, when combined with the substantial elimination of carbon deposit in the channel 5, insures a continuous passageway for oil to pass away from the ring 1. The edges 18 and 19 of the projecting ends move against side edges as 20 of the connecting portions 4 and wear or break away any possible carbon deposit either of a hard or soft nature thereon.

The ability of the ring element 10 to maintain the size of oil openings constant is also of importance in other respects. For instance, it has been necessary to make radially extending oil openings as large as possible to compensate for carbon formation, and in so doing, the body of the ring was materially weakened. By the piston ring assembly of the invention, in which the ring element is formed with inwardly projecting ends as 17, it becomes no longer necessary to increase the size of the oil passage to a point where the body of the ring is undesirably weakened.

With reference to other piston ring constructions with which a ring element such as member 10 may be associated, Fig. 7 discloses a flexible piston ring 21, having a groove 26. This flexible ring 21 is of the same general character described and claimed in my co-pending application Ser. No. 326,338, now Patent No. 2,224,338, filed March 28, 1940. The ring is composed of a strip of resilient sheet material formed with cuts 22 and 23 extending from opposite edges of the strip in overlapping relation. The strip is bent longitudinally of itself to form opposite sides and the cuts provide segments as 24 and 25 which are resiliently compressible with respect to one another throughout a circumferential length of the material, thereby imparting circumferential and radial flexibility in the ring when its ends are in an abutting position. In a ring such as 21, it may be desired to construct the cuts 22 and 23 of a relatively small width, as for instance by shearing operations. Such cuts are more affected by carbon formation than openings of a relatively larger character would be. The ring element 10 is particularly effective in maintaining free of carbon the inner sides of a structure having such relatively small openings. In such a construction, the ring may or may not engage the cylinder wall.

The ring element of the invention may also be associated with other types of rings such as flexible rings formed of reversely folded sheet metal, as described and claimed in Patent No. 2,076,542, issued to me April 13, 1937, and various other combinations of cast materials and sheet metal of well known type.

With reference to changes in the ring element construction, Figs. 5 and 6 illustrate a flexible oil ring 32 of the overlapping opening type already described. With this ring is loosely associated a ring element 33 which also has circumferential flexibility throughout itself when its ends are in abutting relation. This ring 33 consists of a strip of resilient sheet material reversely bent upon itself to provide inwardly projecting ends 34 of a modified character. In this arrangement the projecting ends 34 are designed to extend between the connecting portions 35 and 36 of the ring 32 in the same manner and with similar results as already described in connection with the projecting ends 17 of the ring element of Fig. 3. In the present arrangement, however, there is a further function not present in the earlier form of ring referred to. The ring 33 flexes throughout its unit length with the ring 32 and in this way avoids interfering or limiting the extensibility or contractility of the ring 32 throughout its unit length.

In Figs. 11 and 12, I have shown another flexible ring element 37 disposed in the channel of an oil ring 38. Both the oil ring 38 and the ring element 37 comprise structures generally similar to structures of the overlapping opening type already described. However, in the case of the ring element 37 it will be noted that the material of which it is composed is completely folded over upon itself to form a double edge 37a more clearly shown in Fig. 11. The ring element 37 is designed to bear on the wall of a cylinder and this provides an additional oil scraping edge for the oil ring 38 in the same manner as the ring shown in Figs. 1–3 inclusive. It should be observed, however, that both the ring 38 and ring element 37 are contractible and extensible throughout their unit length, and the ring element 37 is therefore illustrative of a member of this type which exerts a uniform radial pressure on a cylinder wall.

In Fig. 8 there has been shown a relatively smaller type of ring element 27 which does not engage the cylinder wall and which is illustrative of material such as a wire of square cross section or other form. The element 27, as well as ring elements 28 and 33, is illustrative of a member which depends for its axial movement, with respect to the ring in which it is received, entirely upon momentum set up during reciprocation of a ring in a cylinder. Such a construction is cheap, light and easily assembled. Various other arrangements of piston ring assemblies may be resorted to, as for example, that shown in Fig. 10, in which the ring element 28 comprises a chain member particularly intended to be illustrative of a collapsible ring element for breaking down or reducing carbon formation in an oil control ring and the modifications shown in Fig. 9 in which the ring element 29 comprises a wire of round cross section associated with a ring 21. In this construction connecting portions 30 and 31 of ring 21 are arranged in offset relation with respect to one another and the ring element 29 is interwoven in loosely disposed relation between the connecting portions.

It will be seen that the carbon prevention members of the invention are highly effective in preventing carbon in various types of rings and in substantially improving the life and efficiency of oil rings generally. These novel results have been successfully embodied in flexible rings of the type which are extensible and contractible throughout their unit length.

While I have shown preferred embodiments of the invention, it should be understood that various changes and modifications may be resorted to in keeping with the spirit of the invention.

Having described my invention, I claim:

1. A piston ring construction comprising spaced-apart layers of piston ring material, connecting portions for the layers, and a circumferentially flexible element loosely disposed between the said sides and adapted to function as a carbon reducing agent.

2. A piston ring construction comprising spaced-apart layers of piston ring material, connecting portions for the layers, said layers having openings which overlap one another to impart flexibility to the ring, a second ring member composed of layers of material and connecting portions therefor, said second ring member being loosely disposed between the sides in the said first ring, the connecting portions of the said second ring extending between the connecting portions of the said first ring.

3. A piston ring comprising spaced-apart layers of piston ring material, connecting portions for the layers, said layers having openings extending radially of the sides in overlapping relation to impart circumferential and radial flexibility to the ring, a ring element supported between said layers, said ring element presenting projecting ends which extend between the said connecting portions.

4. A piston ring comprising axially spaced-apart sides of piston ring material, a plurality of connecting portions for the sides spaced apart circumferentially of the ring, a ring member mounted between said sides, said ring member comprising a strip of sheet metal folded transversely of itself and presenting projecting ends which extend radially inward between the said connecting portions with their edges disposed toward said sides.

5. A piston ring comprising spaced-apart sides of piston ring material, connecting portions for said sides, said connecting portions extending axially of the ring in spaced-apart relation, ring means mounted between the said sides, said ring means presenting axially disposed portions which extend between the said connecting portions in planes which intersect the planes of said sides.

6. A piston ring construction comprising, in combination, an oil control piston ring body of generally U-shape cross section having substantially spaced-apart side walls, said side walls having radial openings to impart flexibility to the ring, and ring means within the channel provided by said oil ring body and workable therein with a flutter action between said spaced side walls to prevent the deposition or accumulation of carbon within said channel or within said radial openings.

7. In combination in a piston ring construction of the character described, an oil ring of substantially channel shape having spaced sides providing a pair of metering edges for engagement with a cylinder wall, connecting means at the radially inner margins of said side walls, said side walls having radially extending openings and said connecting means having vertically extending extensions of said radial openings, and said openings being co-operatively related to render the rings circumferentially flexible, and means working within the channel of said oil ring and adapted in the operation of the oil ring to strike said side walls with carbon dislodging blows.

8. In combination in a piston ring construction of the character described, an oil ring of substantially channel shape having spaced sides providing a pair of metering edges for engagement with a cylinder wall, connecting means at the radially inner margins of said side walls, said side walls having radially extending openings and said connecting means having vertically extending extensions of said radial openings, and said openings being co-operatively related to render the rings circumferentially flexible, and means working within the channel of said oil ring adapted in the operation of the latter to be agitated within the channel and having means adapted to project into at least said extensions of the openings to maintain the latter clear of carbon deposits.

9. An oil type piston ring construction comprising, in combination, spaced-apart layers of piston ring material, relatively closely spaced connecting portions for said layers providing radially opening slot-like spaces therebetween, and means for inhibiting the deposit or accumulation of carbon within or on said layers or said connecting portions and movably supported between said layers, said inhibiting means presenting projecting portions disposed in planes parallel to the ring axis and adapted in the operation of the inhibiting means to extend into said radially opening spaces for maintaining said spaces free from carbon deposits.

10. A piston ring construction comprising, in combination, spaced-apart layers of piston ring material divided into segments, connecting portions for the segments of said layers and rendering the ring circumferentially flexible, and a wire element loosely associated with said layers and connecting portions for the purpose of reducing formation of carbon thereon, the spacing between said layers being ample to clear said wire element for a substantial range of axial movement between said layers in the operation of the ring and resulting in carbon detaching blows against said layers.

11. In combination in an oil control piston ring, a substantially channel-shaped ring body presenting metering edges at its outer periphery and having oil passages through its inner periphery, a carbon-dislodging member within the channel of said body adjacent to said inner periphery, and spacer members within said channel spaced outwardly from said carbon-dislodging member and inwardly from said metering edges.

12. In combination in a piston ring of the character described, a ring body having substantially spaced side walls, alternately offset connecting members along the inner margins of said walls providing oil openings inwardly from the ring body, and a carbon ring element loosely interwoven through and between said connecting members.

13. In combination in a piston ring of the character described, comprising a series of integrally formed spaced segments in the aggregate defining a substantially channel-shaped body having a uniform pattern of oil openings therethrough, certain portions of the series of segments being radially offset relative to other portions at the inner periphery of the ring, and a carbon-dislodging ring interwoven in loosely disposed relation between said relatively offset portions.

14. In combination in a piston ring construction of the character described, spaced-apart side portions, connecting means for said portions, and a second ring member composed of a plurality of layers of material and loosely disposed between said side portions.

15. In a piston ring of the character described, a substantially channel-shaped ring body, and a co-operating ring member working within the channel of said ring body, said ring member being composed of connected circumferentially relatively movable elements.

16. In combination in a piston ring construction of the character described, a substantially channel-shaped main ring body, and a circumferentially flexible scavenger ring co-operating within the channel of said main ring body with a back and forth axial flutter action operative to maintain the ring body substantially free from carbon deposition.

17. In combination in a piston ring construction of the character described, a circumferentially flexible substantially U-shaped piston ring body, and a circumferentially flexible carbon ring element operable within the channel of said ring body to maintain the same substantially free from carbon deposition in the operation of the piston ring.

18. In combination in a piston ring construction of the character described, a circumferentially and radially flexible piston ring body of substantially U-shaped cross section, and a member within the channel of the ring body movable in the operation of the ring to deter carbon deposition on said body.

19. In combination in a piston ring of the character described, a piston ring body of generally U-shape cross section opening radially outwardly and having radially inwardly opening oil flow apertures, and a supplemental ring element disposed between the axial walls defining the U and comprising a metal strip disposed edgewise relative to said walls and having a series of folds therein projecting radially inwardly through said oil flow apertures, the width of said supplemental element being less than the space between said walls and thus axially movable relative to the piston ring body for carbon-dislodging action.

THOMAS A. BOWERS.

REFERENCES CITED

The following references are of record in the file of this patent:

UNITED STATES PATENTS

| Number | Name | Date |
|---|---|---|
| 1,342,380 | Hachmann | June 1, 1920 |
| 2,034,770 | Porter | Mar. 24, 1936 |
| 2,224,338 | Bowers | Dec. 10, 1940 |
| 2,273,691 | Bowers | Feb. 17, 1942 |
| 2,280,744 | Bowers | Apr. 21, 1942 |
| 2,291,945 | Bowers | Aug. 4, 1942 |
| 2,400,109 | Ernst | May 14, 1946 |